10

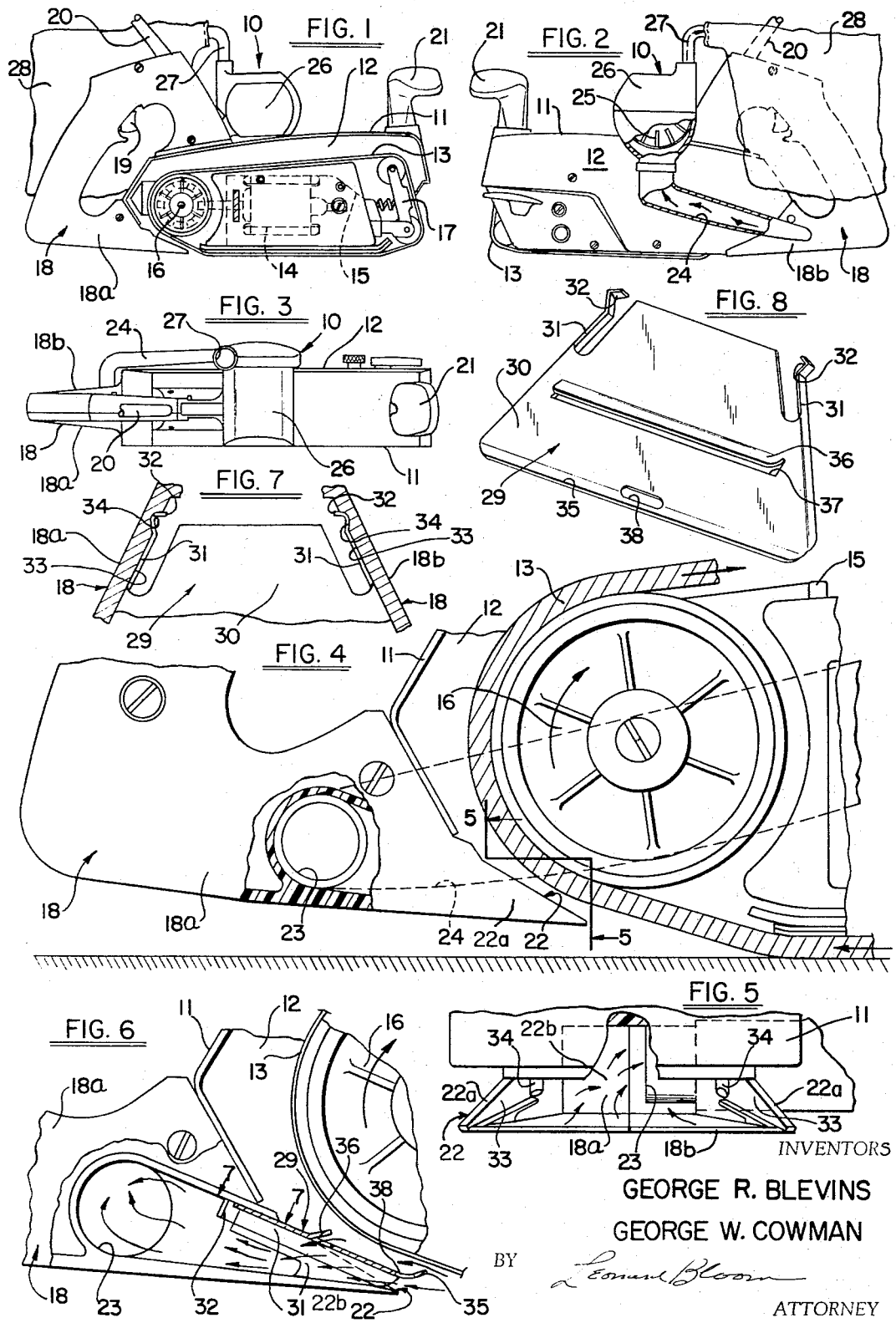

United States Patent Office 3,363,367
Patented Jan. 16, 1968

3,363,367
DUST COLLECTION INSERT MEANS
FOR BELT SANDER
George R. Blevins and George W. Cowman, Baltimore, Md., assignors to The Black and Decker Manufacturing Company, Towson, Md., a corporation of Maryland
Filed Apr. 29, 1965, Ser. No. 451,719
7 Claims. (Cl. 51—170)

ABSTRACT OF THE DISCLOSURE

The device disclosed herein is a portable, power operated abrading tool which includes a housing having driving and driven pulley means spacedly supported therein. An endless belt is frictionally entrained over the pulley means and an electric motor rotates the driving pulley means and moves the belt. A dust collecting means is associated with the housing and includes port means and inlet means, the latter being adjacent the working run of the belt so that dust particles generated during tool operation are delivered to the dust collecting means. The inlet means is constructed and arranged to accommodate belts of different thicknesses and yet maintain efficient dust collection.

The present invention relates to a dust collection insert means for a belt sander, and more particularly, to an insert member which is resiliently retained in the housing of the tool whenever a relatively thinner belt is used, thereby maintaining the efficiency of the overall dust collection system.

The present invention finds particular utility for use in conjunction with a belt-type of power-operated abrading tool, one which is capable of sanding, polishing, burnishing operations, and the like. In this type of tool, the housing selectively receives one of a variety of endless belts, each for a different operation, with some of the belts being thicker than the others. The polishing or burnishing belt, for example, is relatively thick and generally comprises a fibrous matrix having a suitable burnishing agent retained therein. A typical sanding belt, on the other hand, is relatively thin and generally comprises a plurality of suitable grit particles adapted for the rapid removal of wood, metal, or other work materials.

It is an object of the present invention to maintain the efficiency of the dust removal or collection system regardless of changes in the belts used in the tool.

To this end, the present invention constitutes an improvement in the dust removal or collection system used on the tool; and this improvement includes, in combination, a dust collection means having an inlet means formed in the housing, whereby the dust particles generated during the operation of the tool are carried along the belt and pass through the inlet means under the influence of the dust collection means. The inlet means is spaced in relation to the belt to accommodate the thickest belt used in the tool, and means are provided to bring this inlet means into closer proximity with the belt whenever a thinner belt is used in the tool, whereby the efficiency of the dust collection means is maintained. This last-named means includes a removable insert which is retained in the housing and projects beyond the inlet means into closer proximity with the thinner belt, and the insert has means included therein for directing the passage of the dust particles through the inlet means and into the dust collection means.

In accordance with the specific teachings of the present invention, the insert comprises a thin resilient member having a main body portion and a pair of integrally-formed side flange portions depending therefrom, whereby the majority of the dust particles pass between the side flanges and below the body portion of the insert, thence through the inlet means in the housing. Each of the side flanges of the insert has a spring hook element formed on its inner end; and a pair of slotted recesses are formed in the housing, one for each of the insert flanges. Each of the slotted recesses has an inward portion with a respective pocket formed therein to receive a respective hook element of the flanges, whereby the insert is resiliently retained within the housing.

In accordance with the further teachings of the present invention, the body portion of the insert has a slotted opening formed therein transversely of the inlet means, and a baffle extends upwardly from the slotted opening, whereby an additional percentage of the dust particles (that may perhaps pass above the body portion of the insert) are directed by the baffle through the slotted opening and into the inlet means in the housing.

These and other objects of the present invention will become apparent from a reading of the following specification, taken in conjunction with the enclosed drawings, in which:

FIGURE 1 is a side elevation of a typical portable electric belt sander with which the teachings of the present invention may find particular utility;

FIGURE 2 is a side elevation of the belt sander, viewed from the side opposite to that of FIGURE 1, and showing a conduit leading from the end handle into a separate motor-driven fan and thence into a dust collection bag;

FIGURE 3 is a top plan view of the tool shown in FIGURE 1;

FIGURE 4 is an enlarged fragmentary portion of FIGURE 1, showing a relatively-thick belt used in the tool;

FIGURE 5 is a view taken along the lines 5—5 of FIGURE 4, with the belt and driving pulley being removed, and showing the inlet means formed in the housing to receive the dust particles carried along the belt;

FIGURE 6 is a view corresponding substantially to a portion of FIGURE 4, but showing a relatively-thinner belt used in the tool, and further showing the dust collection insert of the present invention, the insert preferably being resiliently retained within the inlet means in the housing;

FIGURE 7 is a detail section view, taken along the lines 7—7 of FIGURE 6, and showing the manner in which the spring hook elements of the insert are received within the respective pockets formed within the respective slotted recesses within the housing; and FIGURE 8 is a perspective of the insert of the present invention.

With reference to FIGURES 1-3, there is illustrated a typical belt sander 10 with which the teachings of the present invention may find particular utility. The sander 10 generally comprises an overall housing 11 formed with a side wall 12, an endless belt 13 within the housing, a motor 14 in a frame 15, the motor and its frame preferably (but not necessarily) being disposed within the belt, a rear driving pulley 16 at one end of the belt, a front guiding pulley means 17 at the opposite end of the belt, an end handle portion 18 of the overall housing, the handle being provided with a trigger switch 19 for energizing the unit from an electrical line cord 20, and a front handle 21 to assist in the manual manipulation and control of the tool.

With further reference to FIGURES 4 and 5, it is seen that the housing 11 extends partly around the rear pulley 16. An inlet means 22 is provided in the housing and preferably is formed in a terminal portion 22A thereof between the end handle 18 and the driving pulley 16 rearwardly of the working or lower run of the belt. The terminal portion 22A extends to a position adjacent the lower or working run of the belt and has an inlet opening 22B formed therein. The end handle preferably is split into complementary mating halves 18a and 18b, as shown more clearly in FIGURE 5, and the dust particles which are generated during the sanding or abrading operations are carried along the lower run of the belt and pass into the inlet opening 22B, and thence into a port 23 which leads to a conduit 24. This conduit 24, see FIGURE 2 again, is in communication with a fan 25 driven by a separate motor 26 mounted on top of the housing 11. The fan 25 discharges the dust particles through a discharge pipe 27 and thence into a dust collection bag 28 or other suitable receptacle. The motor 26 (which drives the dust-collection fan 25) is separate from the main motor 14 and is not effected by loads placed upon the latter, and both motors are wired for simultaneous operation when the trigger switch 19 is depressed. The impeller effect of the moving belt assists the suction effect produced by the fan 25 to efficiently remove the dust particles from the work. The combination of the port 23, conduit 24, fan 25, inlet opening 22B, motor 26, discharge pipe 27, and bag 28 may be referred to generally as a "dust collection means."

The belt sander 10 is typical of a belt-type of power-operated abrading tool which is capable of a variety of operations, such as sanding, polishing, burnishing operations, and the like. A suitable belt is used for each operation. Some of the belts are thicker than the others, and obviously the tool housing is designed to accommodate the thickest belt that may be used in the tool. The belt shown in FIGURE 4 is used for polishing or burnishing operations, especially for metal surfaces, and generally comprises a fibrous matrix having a suitable burnishing agent retained therein. The belt shown in FIGURE 6, on the other hand, is indicative of a typical abrading belt and comprises a number of grit particles of a suitable density retained on a cloth, paper, or other suitable backing material. The burnishing belt of FIGURE 4 is considerably thicker than the sanding belt of FIGURE 6, with the actual thickness being illustrated somewhat schematically in the drawings. The housing terminal portion 22A is spaced from the rear pulley 16 a distance to closely accommodate the thick belt, as shown in FIG. 4. However, it will be appreciated that when a thinner belt is used, such as is shown in FIG. 6, a gap of considerable size exists between the terminal portion 22A and this belt. In order to maintain efficiency in the dust pick-up sequence, it is necessary that this gap be restricted. Stated another way, it is necessary to bring the inlet opening 22B into close communication with the belt when the relatively thin belt is used for efficient dust pick up. To this end, the insert 29 of the present invention is provided.

This insert 29, shown in perspective in FIGURE 8, comprises a thin resilient member, preferably stamped from a suitable sheet metal, and having a main body portion 30 and a pair of integrally-formed side flange portions 31 depending therefrom. The side flange portions 31 each have a spring hook element 32, see FIGURES 7 and 8, formed on their respective inner ends. A pair of slotted recesses 33 are formed, respectively, in the terminal portion 22A, with each of the slotted recesses accommodating a respective one of the side flanges of the insert. Each of the slotted recesses 33 has an inward portion formed with a respective pocket 34 which receives a respective hook element 32 of the flanges, such that the insert is resiliently retained within the housing as shown in FIGURE 7.

In such a manner, at least a portion of the insert 29 is between the terminal portion 22A and the rear pulley 16 so that the inlet opening 22B is in close communication with the belt 13 whenever a thinner belt is used in the tool, such that the efficiency of the dust collection means is maintained.

As shown more clearly in FIGURE 6, the majority of the dust particles pass between the side flanges 31 and below the main body portion 30 of the insert 29, into the inlet opening 22B, and thence into the port 23 to the conduit 24 and ultimately into the dust collection bag 28. The insert 29 has a bent-up toe portion 35 in close proximity to the lower run of the belt for directing the dust particles below the main body portion of the insert and thence into the inlet means in the housing. The lower "run" of the belt travels in a rearward direction, and the dust particles are impelled by the belt and by the suction of the dust collection means and pass through the insert 29 and into the inlet means 22 as indicated by the arrows in the drawings. An additional percentage of the dust particles which may pass beyond the bent-up toe 35 are caught by a baffle 36 formed in the main body portion of the insert 29, and these additional dust particles pass through a slotted opening 37 formed transversely of the insert 29, thence into the inlet means 22 in the housing. In addition, the bent-up toe 35 has a slot 38, see FIGURE 8 again, to receive a screwdriver blade so as to assist in the insertion and removal of the insert 29 within the tool.

Obviously, many modifications may be made without departing from the basic spirit of the present invention; and accordingly, within the scope of the appended claims, the invention may be practiced other than has been specifically described herein.

We claim:
1. In a belt-type of power-operated-abrading tool capable of sanding, polishing, burnishing operations, and the like, including a tool housing which may selectively receive at least two belts, each for a different operation, one being a relatively thick belt and the other being a relatively thin belt, the improvement which comprises, in combination:
 (a) said housing including an elongated portion having at least one front and at least one rear pulley supported thereon;
 (b) said pulleys being adapted to have said belt entrained thereover to define a working run extending generally longitudinally of said elongated portion and traveling in a rearward direction;
 (c) said housing extending in confronting relation to said rear pulley;
 (d) dust collection means associated with said housing and adapted to receive dust particles carried along the working run of said belt during operation of said tool;
 (e) said dust collection means including a terminal portion of said housing adjacent said working run and having an inlet opening therein;
 (f) said terminal portion being spaced in relation to said rear pulley to accommodate said thick belt;
 (g) an insert removably secured to said housing and having at least a portion positioned between said terminal portion and said rear pulley and in close proximity with the belt when the thinner belt is used;
 (h) said insert being adapted to help pick up dust particles moved along said working run and having means communicating with said inlet opening and being effective to bring said inlet opening into close communication with the working run of said thinner belt;
 (i) whereby dust particles generated during operation of said tool and carried along said working run of said thinner belt are directed by said insert into said inlet opening.
2. The combination of claim 1, wherein:
 (a) said insert portion has an opening therethrough which communicates with said inlet opening.
3. The combination of claim 1 wherein:
 (a) said insert portion is spaced from said housing terminal portion and forms therewith an extension for said inlet opening.
4. The combination of claim 1 wherein:
 (a) said insert includes a flat body having a resilient spring hook at either side thereof and integral therewith, (b) said housing has a pair of slotted recesses within said inlet opening;

(c) each of said slotted recesses having a pocket formed therein to receive a respective one of said hooks to resiliently retain said insert on said housing.

5. In a belt-type of power-operated abrading tool capable of sanding, polishing, burnishing operations, and the like, wherein the tool housing may selectively receive one of a variety of endless belts, each for a different operation, with some of the belts being thicker than the others, the improvement which comprises, in combination:

(a) dust collecting means including inlet means formed in the housing, whereby the dust particles generated during the operation of the tool are carried along the belt and pass through said inlet means;

(b) said inlet means being spaced in relation to the belt to accommodate the thickest belt used in the tool; and (c) means to bring said inlet means into closer proximity to the belt whenever a thinner belt is used in the tool, whereby the efficiency of the dust collection means is maintained;

(d) said last-named means including a removable insert comprising a thin resilient member having:
  (1) a main body portion; and
  (2) a pair of integrally-formed side flange portions depending therefrom, whereby the majority of the dust particles pass between said flanges and below said body portion of said insert, and thence through said inlet means in the housing; with
  (3) each of said flanges of said insert having a spring hook element formed in its inner end; and wherein:

(e) a pair of slotted recesses are formed in the housing, one for each one of said side flanges of said insert;

(f) each of said slotted recesses having inward portions with respective pockets formed therein to receive said hook elements of said insert, whereby said insert is resiliently retained within the housing.

6. The combination of claim 5, wherein:

(a) said body portion of said insert has a slotted opening formed therein transversely of said inlet means; and wherein:

(b) a baffle extends upwardly from said slotted opening, whereby an additional percentage of dust particles that may pass above said body portion of said insert are directed by said baffle through said slotted opening and into said inlet means in the housing.

7. In a portable belt-type of power-operated abrading tool capable of sanding, polishing, burnishing operations and the like, including a tool housing which may selectively receive at least two belts each for a different operation, one being a relatively thick belt and the other a relatively thin belt, the improvement which comprises, in combination:

(a) a housing having a drive motor supported thereon;

(b) said housing having an elongated, belt receiving portion;

(c) pulley means including at least one front pulley and at least one rear pulley supported within said belt receiving housing portion for rotation about generally parallel axes;

(d) means interconnecting said motor and at least one of said pulleys;

(e) said pulleys adapted to have said belt entrained thereover and defining a lower, working run which travels in a longitudinal rearward direction;

(f) dust collection means associated with said housing and adapted to receive dust particles carried along the working run of the belt during operation of said tool;

(g) said dust collection means including a terminal portion of said housing below the axis of said rear pulley and adjacent the rear end of said lower, working run and having an inlet opening therein;

(h) said terminal portion being spaced in relation to said rear pulley to accommodate said thick belt;

(i) means removably mounted on said housing and having at least a portion thereof positioned between said terminal portion and said rear pulley and in close proximity with the belt when the thinner belt is used;

(j) said removably mounted means being adapted to help pick up dust particles moved along said working run and communicating with said inlet opening and operable to bring said inlet opening into close communication with the lower, working run of said thinner belt;

(k) whereby dust particles generated during operation of said tool and carried along said working run of said thinner belt are directed into said inlet opening.

References Cited
UNITED STATES PATENTS

| | | | |
|---|---|---|---|
| 1,945,425 | 1/1934 | Emmons | 51—170 X |
| 2,069,502 | 2/1937 | Myers | 51—170 |
| 2,106,535 | 1/1938 | Pattison | 51—170 |
| 2,232,149 | 2/1941 | Tautz | 51—135 |
| 2,654,190 | 10/1953 | Mitchell | 51—170 |
| 3,180,063 | 4/1965 | Burrows. | |

HAROLD D. WHITEHEAD, *Primary Examiner.*